Patented May 15, 1951

2,552,978

UNITED STATES PATENT OFFICE 2,552,978

METHOD FOR PREPARING THIOPHENE CARBOXYLIC ACIDS

Kenneth L. Kreuz, Fishkill, N. Y., assignor to The Texas Company, New York, N. Y., a corporation of Delaware No Drawing. Application April 12, 1949, Serial No. 87,121

7 Claims. (Cl. 260—332.2)

This invention relates to a novel method of preparing carboxyl-substituted thiophene compounds. More particularly, the invention discloses a method of preparing thenoic acid and esters thereof.

The method of this invention involves the introduction of a —COOR group, wherein R is an alkyl group or an alkenyl group, into a thiophene nucleus by reacting a thiophene compound containing at least one alpha hydrogen atom with carbon tetrachloride and a strong alkali metal hydroxide in alcohol solution at a temperature between 65 and 210° C. and at autogenous pressure. Esters of thenoic acid which are readily hydrolyzed to yield free thenoic acids, are obtained as the primary product of reaction.

Thiophene compounds containing at least one alpha hydrogen atom react in accordance with the method of this invention to yield carboxyl-substituted thiophene derivatives. Thiophene itself and thiophene homologs containing at least one alpha hydrogen atom comprise the preferred reactants. However, substituted thiophene compounds which contain at least one alpha hydrogen atom and which are alkali stable also react with carbon tetrachloride and an alkali metal hydroxide to give a thiophene derivative containing a carboxyl group in alpha position. 3-nitrothiophene is an example of such an alkali-stable substituted thiophene derivative which undergoes the carbon tetrachloride-alkali metal hydroxide condensation of this invention to yield a nitro-substituted thenoic acid.

The introduction of a —COOR group into the alpha position of thiophene compound is effected with carbon tetrachloride and an alkali metal hydroxide in alcohol solution. Commercial grade carbon tetrachloride serves adequately as a reactant. It is interesting to note that the introduction of an aldehyde group —CHO into a thiophene nucleus by reaction of thiophene compounds with chloroform and alkali does not appear feasible.

The reaction between a thiophene compound containing an alpha hydrogen atom and carbon tetrachloride is specific to the use of alkali metal hydroxides as alkaline condensation agents. The carboxylation of thiophene with carbon tetrachloride takes place with sodium hydroxide, potassium hydroxide, cesium hydroxide and lithium hydroxide as condensation agents. The alkali metal hydroxides are all alcohol soluble so that the reaction is readily effected therewith.

The reaction between carbon tetrachloride, a thiophene compound containing an alpha hydrogen atom and an alkali metal hydroxide is advantageously effected in alcohols such as methyl, ethyl and propyl alcohols. Higher alcohols can be employed the only limitation being that the alkali metal hydroxide employed be appreciably soluble in the alcohol.

Esters of thenoic acid are obtained by the carboxylation reaction of the subject invention. The esters are readily hydrolyzed with dilute aqueous alkaline solution at reflux temperature to form salts of thenoic acid which upon acidification yield the free acids.

Temperatures of 65° to 210° C. are employed to effect the introduction of a —COOR group into the alpha position on a thiophene nucleus in accordance with the method of this invention. Advantageously, however, the reaction is effected at a temperature falling between about 120 and 185° C. In the introduction of a —COOR group into thiophene itself, it has been found that best results are obtained at a temperature of about 150° C.

The condensation of a thiophene compound containing an alpha hydrogen atom with carbon tetrachloride and an alkali metal hydroxide in alcohol solution is advantageously effected in a sealed pressure vessel. The reaction is allowed to take place in the autoclave at autogenous pressure. The autogenous pressure ordinarily falls within the range of between 100 to 500 pounds per square inch gauge.

The reaction requires about 2 to 8 hours in an autoclave. Ordinarily, about 3 to 4 hours at reaction temperature are required to effect the condensation with alcoholic solvent such as ethanol; longer reaction times are generally required with higher molecular weight alcohols.

Advantageously, the pressure vessel is equipped with shaking or stirring means so that better contacting of the reaction mixture can be effected.

The method of this invention is illustrated in detail by the following examples:

*Example I*

Eighty-four grams of thiophene, 155 grams of carbon tetrachloride and 100 grams of potassium hydroxide dissolved in 400 grams of ethyl alcohol were charged to a one-liter Adkins-type electrically heated shaker bomb, equipped with a thermowell, pressure gauge and a mechanical rocking device. Temperature was determined by means of an iron-constantan thermocouple. The reactants were heated rapidly to about 150° C., whereupon an exothermic reaction occurred with a sudden pressure increase. A temperature of 150° C. was maintained for an overall period of 4 hours. After cooling, residual gases consisting chiefly of hydrogen, methyl chloride and ethyl chloride were bled off. The remaining product was made slightly alkaline and steam distilled. The steam distillate yielded 30 grams of ethyl thenoate, boiling in the region of 94° C. under approximately 10 mm./Hg pressure. Ethyl thenoate thus prepared has a boiling point of 215° C. and a saponification number of 367 (calculated 359). Saponification yielded thenoic acid, M. P. 126° C., neutral equivalent 436 (calculated 437).

*Example II*

Forty-two grams of thiophene, 77 grams of carbon tetrachloride and 50 grams of potassium hydroxide dissolved in 200 grams of ethyl alcohol were charged to a 500 cc. electrically heated vertical reactor equipped with a thermowell, a pressure gauge and a stainless steel propeller-type stirrer operated at 375 R. P. M. Temperature was determined by means of an iron-constantan thermocouple. The valves were closed and the reactor rapidly brought up to the desired temperature, 150° C., and maintained for four hours so the average temperature was 148° C. The pressure developed was 220 p. s. i. g. The reactor was cooled to room temperature and the normally gaseous constituents formed in the reaction, chiefly ethyl chloride, methyl chloride and hydrogen, were bled off. The remainder of the product, weighing 295 grams, was mixed with a solution of 100 grams of potassium hydroxide dissolved in 250 cc. of water and heated to reflux for six hours. Non-acidic materials were then removed by extraction with 100 cc. of carbon tetrachloride. The caustic solution was concentrated to one-half volume, acidified with an excess of hydrochloric acid; thenoic acid was extracted from the acidified mixture with diethyl ether. Fifteen grams of thenoic acid (a yield of 23.4 per cent of theory) was obtained which, after recrystallization from hot water, melted at 121–125.6° C. as compared with a literature value of 126° C.

*Example III*

Forty-nine grams of 2-methyl thiophene, 77 grams of carbon tetrachloride and 300 grams of a 25 per cent solution of potassium hydroxide in ethanol were charged to a reactor of the type described in Example II. The reaction mixture was stirred for 4 hours at an average temperature of 150° C. The reactor was then cooled to room temperature and the normally gaseous constituents formed in the reaction were bled off. The rest of the reaction product was mixed with a solution of 100 grams of potassium hydroxide dissolved in 250 cc. of water and heated under reflux for six hours. Non-acidic materials were removed by extraction with 100 cc. of carbon tetrachloride. The residual caustic solution was concentrated to one-half volume and acidified with an excess of hydrochloric acid; methylthenoic acid was extracted from the acidified mixture with diethyl ether. Twenty grams of crude methylthenoic acid were obtained, which after several recrystallizations from aqueous alcohol yielded long colorless needles melting at 131–135° C. This product was apparently a mixture of isomeric methylthenoic acids. Elementary analysis showed the material to contain 50.57 per cent carbon, 4.13 per cent hydrogen and 22.51 per cent sulfur as compared with calculated theoretical values of 50.68 per cent, 4.25 per cent and 22.55 per cent for the elements in the order named.

Obviously many modifications and variations of the invention, as hereinbefore set forth, may be made without departing from the spirit and scope thereof and, therefore, only such limitations should be imposed as are indicated in the appended claims.

I claim:

1. A method for introducing a —COOR group, wherein R is an aliphatic group, into a thiophene nucleus which comprises reacting a compound containing a thiophene nucleus in which there is at least one alpha hydrogen atom with carbon tetrachloride and an alkali metal hydroxide in an alcoholic solvent of the general formula ROH, said R in said ROH and said COOR being the same aliphatic group at a temperature between 65 and 210° C.

2. A method for introducing a —COOR group, wherein R is an aliphatic group, into a thiophene nucleus which comprises reacting a compound containing a thiophene nucleus in which there is at least one alpha hydrogen atom with carbon tetrachloride and an alkali metal hydroxide in an alcoholic solvent of the general formula ROH, said R in said ROH and said COOR being the same aliphatic group in a pressure vessel at a pressure less than about 500 pounds per square inch and at a temperature between 65 and 210° C.

3. A method according to claim 2 in which the alpha hydrogen-containing thiophene compound is thiophene.

4. A method according to claim 2 in which the alpha hydrogen-containing compound is a thiophene homolog.

5. A method according to claim 2 in which the alkali metal hydroxide is potassium hydroxide.

6. A method according to claim 2 in which the mol ratio of alkali metal hydroxide to carbon tetrachloride is at least 2.

7. A method according to claim 2 in which ethyl alcohol is employed as the solvent.

KENNETH L. KREUZ.

No references cited.